US012354369B2

(12) United States Patent
Moritz et al.

(10) Patent No.: US 12,354,369 B2
(45) Date of Patent: Jul. 8, 2025

(54) METHOD FOR AUTOMATICALLY EXECUTING A VEHICLE FUNCTION, METHOD FOR EVALUATING A COMPUTER VISION METHOD AND EVALUATION CIRCUIT FOR A VEHICLE

(71) Applicant: Volkswagen Aktiengesellschaft, Wolfsburg (DE)

(72) Inventors: Ruby Moritz, Wolfsburg (DE); Peter Schlicht, Wolfsburg (DE); Fabian Hüger, Wolfenbüttel (DE); Yasin Bayzidi, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 532 days.

(21) Appl. No.: 17/702,535

(22) Filed: Mar. 23, 2022

(65) Prior Publication Data

US 2022/0309799 A1 Sep. 29, 2022

(30) Foreign Application Priority Data

Mar. 24, 2021 (EP) ..................................... 21164745

(51) Int. Cl.
*G06V 20/58* (2022.01)
*B60W 40/10* (2012.01)
(Continued)

(52) U.S. Cl.
CPC ............. *G06V 20/58* (2022.01); *B60W 40/10* (2013.01); *G06T 7/11* (2017.01); *G06T 7/194* (2017.01);
(Continued)

(58) Field of Classification Search
CPC ....... G06V 20/58; G06V 20/56; B60W 40/10; B60W 2420/403; B60W 2420/408;
(Continued)

(56) References Cited

U.S. PATENT DOCUMENTS

| 8,842,883 | B2 | 9/2014 | Chen et al. .................... 382/103 |
| 10,354,406 | B2 | 7/2019 | Posner et al. |

(Continued)

FOREIGN PATENT DOCUMENTS

| CN | 112241757 A | 1/2021 | ............... G06K 9/00 |
| DE | 102019204196 A1 | 10/2020 | ............ B60W 40/02 |
| WO | 2019/222358 A1 | 11/2019 | ............ B60W 30/09 |

OTHER PUBLICATIONS

Krizhevsky, Alex et al., "ImageNet Classification with Deep Convolutional Neural Networks," Advances in neural information processing systems 25, 9 pages, 2012.

(Continued)

*Primary Examiner* — Stephen R Koziol
(74) *Attorney, Agent, or Firm* — Slayden Grubert Beard PLLC

(57) ABSTRACT

Disclosed is a method for automatically executing a vehicle function of a vehicle based on spatially resolved raw sensor data for environment perception generated by at least one sensor of the vehicle. The method comprises
receiving spatially resolved raw sensor data generated by the at least one sensor and
processing sensor data which are characteristic of the spatially resolved raw sensor data using a processor. The processor may determine at least one region of interest of the sensor data and at least one class for classifying the region of interest. The method further comprises
processing the sensor data based on the determined region of interest and hereby determining at least one local
(Continued)

quality parameter which is characteristic for the quality of the sensor data with respect to at least a section of the region of interest and executing the vehicle function in dependence on the local quality parameter.

18 Claims, 1 Drawing Sheet

(51) Int. Cl.
  *G06T 7/11* (2017.01)
  *G06T 7/194* (2017.01)
(52) U.S. Cl.
  CPC . *B60W 2420/403* (2013.01); *B60W 2420/408* (2024.01)
(58) Field of Classification Search
  CPC ......... G06T 7/11; G06T 7/194; G01S 17/931; G01S 17/86; G06N 3/04; G06N 3/08
  See application file for complete search history.

(56) References Cited

U.S. PATENT DOCUMENTS

| | | | |
|---|---|---|---|
| 10,452,956 B2 | 10/2019 | Kwant et al. | |
| 10,461,076 B1* | 10/2019 | Brewer | H01L 21/76898 |
| 11,521,396 B1* | 12/2022 | Jain | G06F 18/2415 |
| 11,620,838 B2* | 4/2023 | Segal | G06N 20/00 382/103 |
| 11,941,337 B1* | 3/2024 | Xu | G06F 30/39 |
| 2013/0178953 A1* | 7/2013 | Wersborg | B23K 26/34 700/48 |
| 2013/0223724 A1* | 8/2013 | Wersborg | B23K 28/02 382/152 |
| 2015/0220789 A1 | 8/2015 | Wood et al. | 382/103 |
| 2017/0248963 A1* | 8/2017 | Levinson | G05D 1/0274 |
| 2019/0068950 A1* | 2/2019 | Wippermann | H04N 23/45 |
| 2019/0147372 A1* | 5/2019 | Luo | G06N 20/00 706/20 |
| 2020/0249671 A1 | 8/2020 | Kim et al. | |
| 2020/0250473 A1 | 8/2020 | Elluswamy et al. | |
| 2020/0263996 A1* | 8/2020 | Gokhale | G01S 17/89 |
| 2020/0284883 A1* | 9/2020 | Ferreira | H04N 25/773 |
| 2021/0019620 A1 | 1/2021 | Munoz Delgado et al. | |
| 2021/0046940 A1* | 2/2021 | Feser | G06T 7/12 |
| 2021/0276595 A1* | 9/2021 | Casas | G06V 30/19173 |
| 2024/0255613 A1* | 8/2024 | Sanson | G01S 13/931 |

OTHER PUBLICATIONS

Girshick, Ross et al., "Rich Feature Hierarchies for Accurate Object Detection and Semantic Segmentation," IEEE Conference on Computer Vision and Pattern Recognition, 21 pages, Jun. 23, 2014.
Simonyan, Karen et al., "Very Deep Convolutional Networks for Large-Scale Image Recognition," arXiv preprint arXiv: 1409.1556, 14 pages, Apr. 10, 2015.
Ronneberger, Olaf et al., "U-Net: Convolutional Networks for Biomedical Image Segmentation," Medical Image Computing and Computer-Assisted Intervention—MICCAI, Lecture Notes in Computer Science, vol. 9351, 8 pages, May 18, 2015.
Long, Jonathan et al., "Fully Convolutional Networks for Semantic Segmentation," IEEE Conference on Computer Vision and Pattern Recognition, pp. 3431-3440, Jun. 7, 2015.
Noh, Hyeonwoo et al., "Learning Deconvolution Network for Semantic Segmentation," IEEE International Conference on Computer Vision (ICCV), pp. 1520-1528, Dec. 7, 2015.
Girshick, Ross, "Fast R-CNN," IEEE International Conference on Computer Vision (ICCV), 9 pages, Dec. 7, 2015.
Redmon, Joseph et al., "You Only Look Once: Unified, Real-Time Object Detection," IEEE Conference on Computer Vision and Pattern Recognition (CVPR), pp. 779-788, Jun. 27, 2016.
He, Kaiming et al., "Deep Residual Learning for Image Recognition," IEEE Conference on Computer Vision and Pattern Recognition (CVPR), 12 pages, Jun. 27, 2016.
Ren, Shaoqing et al., "Faster R-CNN: Towards Real-Time Object Detection with Region Proposal Networks," IEEE Transactions on Pattern Analysis and Machine Intelligence, vol. 39, No. 6, 14 Pages, Jun. 1, 2017.
Badrinarayanan, Vijay et al., "A Deep Convolutional Encoder-Decoder Architecture for Image Segmentation," IEEE Transactions on Pattern Analysis and Machine Intelligence, vol. 39, No. 12, 14 pages, Dec. 1, 2017.
Huang, Gao et al., "Multi-Scale Dense Networks for Resource Efficient Image Classification," arXiv preprint arXiv:1703.09844, 14 pages, Jun. 7, 2018.
Bilinksi, Piotr et al., "Dense Decoder Shortcut Connections for Single-Pass Semantic Segmentation," IEEE/CVF Conference on Computer Vision and Pattern Recognition, pp. 6596-6605, Jun. 18, 2018.
Sun, Yanan et al., "Automatically Designing CNN Architectures Using Genetic Algorithm for Image Classification," IEEE Transactions on Cybernetics, vol. 50, No. 9, 14 pages, Apr. 21, 2020.
Shi, Shaoshuai et al., "PV-RCNN: Point-Voxel Feature Set Abstraction for 3D Object Detection," IEEE/CVF Conference on Computer Vision and Pattern Recognition (CVPR), 11 pages, Jun. 13, 2020.
Extended European Search Report, Application No. 21164745.8, 9 pages, Sep. 24, 2021.
He, Qingdong et al., "SVGA-Net: Sparse Voxel-Graph Attention Network for 3D Object Detection from Point Clouds," arXiv preprint arXiv:2006.04043, 9 pages, Dec. 23, 2021.
Realpe, Miguel et al., "Sensor Fault Detection and Diagnosis for Autonomous Vehicles," MATEC Web of Conferences, vol. 30, 6 pages, Jan. 1, 2015.
Fayyad, Jamil et al., "Deep Learning Sensor Fusion for Autonomous Vehicle Perception and Localization: A Review," Sensors, vol. 20, No. 15, 35 pages, Jul. 29, 2020.
Pan, Huihui et al., "Deep Learning Based Data Fusion for Sensor Fault Diagnosis and Tolerance in Autonomous Vehicles," Research Square, URL: https://assets-eu.researchsquare.com/files/rs-122424/v1_covered.pdf?C=1631848756, 16 pages, Dec. 10, 2020.
European Office Action, Application No. 21164745.8, 15 pages, Jan. 3, 2025.

* cited by examiner

METHOD FOR AUTOMATICALLY EXECUTING A VEHICLE FUNCTION, METHOD FOR EVALUATING A COMPUTER VISION METHOD AND EVALUATION CIRCUIT FOR A VEHICLE

CROSS-REFERENCE TO RELATED APPLICATIONS

This application claims priority to European Patent Application No. EP 21164745.8, filed on Mar. 24, 2021 with the European Patent Office. The contents of the aforesaid Patent Application are incorporated herein for all purposes.

TECHNICAL FIELD

The present invention relates to a method for automatically executing a vehicle function of a, for example at least partially autonomously controlled, vehicle based on spatially resolved raw sensor data for environment perception generated by at least one sensor for environment detection of the vehicle. The present invention also relates to a method for evaluating a computer vision method for and/or performed by a processor of a vehicle, in which sensor data for environment perception generated by at least one sensor for environment detection of the vehicle are processed and evaluated, and an evaluation circuit for a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The great advances in deep neural networks (DNNs) in the recent years made vision based detection a primary tool for perception sub-systems within highly automation driving systems.

Examples of such tasks include semantic segmentation (see for instance, Badrinarayanan et al., *A Deep Convolutional Encoder-Decoder Architecture for Image Segmentation*, In: arXiv:1511.00561, 2015; Bilinski et al., *Dense Decoder Shortcut Connections for Single-Pass Semantic Segmentation*, In: Proceedings of the IEEE Conference on Computer Vision and Pattern Recognition (CVPR), 2018; Long et al., *Fully Convolutional Networks for Semantic Segmentation*, In: arXiv:1411.4038, 2014; Noh et al., *Learning Deconvolution Network for Semantic Segmentation*, In: arXiv:1505.04366, 2015; Ronneberger et al., *U-Net: Convolutional Networks for Biomedical Image Segmentation*, In: arXiv:1505.04597, 2015). For details of semantic segmentation and/or the training and architecture of (various) (artificial) neural networks, these references are hereby incorporated by reference.

A further example for such a detection task is 2D/3D object detection (see for instance, Ross Girshick, *Fast R-CNN*, In: arXiv:1504.08083, 2015; Girshick et al., *Rich Feature Hierarchies for Accurate Object Detection and Semantic Segmentation*, In: 2014 IEEE Conference on Computer Vision and Pattern Recognition, doi 10.1109/CVPR.2014.81, p. 580-587, 2014; Ren et al., *Faster R-CNN: Towards Real-Time Object Detection with Region Proposal Networks*, In: Advances in Neural Information Processing Systems 28, p. 91-99, http://papers.nips.cc/paper/5638-faster-r-cnn-towards-real-time-object-detection-with-region-proposal-networks.pdf, 2015; Redmon et al., *You Only Look Once: Unified, Real-Time Object Detection*, In: arXiv:1506.02640, 2015; He et al, *SVGA-Net: Sparse Voxel-Graph Attention Network for 3D Object Detection from Point Clouds*, In: arXiv:2006.04043, 2020; Shi et. al, *PV-RCNN: Point-Voxel Feature Set Abstraction for 3D Object Detection*, In: arXiv:1912.13192, 2019). For details of 2D/3D object detection and/or the training and architecture of (various) (artificial) neural networks, these references are hereby incorporated by reference.

A further example for such a detection task is image classification (see for instance, He et al, *Deep Residual Learning for Image Recognition*, In: arXiv:1512.03385, 2015; Huang et al., Multi-Scale Dense Networks for Resource Efficient Image Classification, In: arXiv:1703.09844, 2017; Krizhevsky et al., *ImageNet Classification with Deep Convolutional Neural Networks*, In: Advances in Neural Information Processing Systems, v1. 25, https://proceedings.neurips.cc/paper/2012/file/c399862d3b9d6b76c 8436e924a68c45b-Paper.pdf, 2012; Simonyan et al., *Very Deep Convolutional Networks for Large-Scale Image Recognition*, In: arXiv:1409.1556, 2014; Sun et al., *Automatically designing CNN architectures using genetic algorithm for image classification*, In: arXiv:1808.03818, 2018; Szegedy et al., *Going Deeper with Convolutions*, In: arXiv:1409.4842, 2014). For details of image classification and/or the training and architecture of (various) (artificial) neural networks, these references are hereby incorporated by reference.

For object detection and semantic segmentation the networks are trained based on annotated training data. The evaluation of such networks is done on both annotated (e.g., so called "mean Intersection over Union (mIoU)") and non-annotated data (e.g., temporal consistency), depending on the evaluation method requirements. However, the state-of-the-art evaluation metrics do not take the input data difficulty into consideration during evaluation process. Based on that, such evaluation methods do not distinguish between hard, moderate, or easy data points.

From prior art providing class-level difficulty factors in multi-label classification problems is known. Here, four different criteria is considered to measure difficulty of an image. However, as the focus of this method is on image classification, no individual object analysis is applied.

Furthermore, from prior art, an efficient Image Dataset Classification Difficulty Estimation for predicting Deep-Learning Accuracy is known. Here, various automatic methods are applied to cluster the datasets into different difficulty levels. However, this method cannot be applied to object detection or semantic segmentation as the variety of shapes and positions of the objects makes it impossible to compare different objects based on the proposed methods.

Moreover, from prior art estimating the difficulty of visual search in an image is known. This method uses human interpretation of difficulty as classification difficulty, which in contrast to concrete mathematical approaches cannot be relied on sufficiently.

The proposed techniques are all considering image classification, and not 2D object detection or semantic segmentation.

The state-of-the-art methods are so far only for image classification, which is not sufficient for highly automated driving systems, where real-time detection of individual objects in various driving scenes may be necessary in order to assure the safety of all the participants in a driving scenario. Based on that it may be necessary to assure that a deep neural network is capable of detecting a reasonable variety of difficulty levels.

SUMMARY

A need exists for a solution which may allow to provide that a DNN or any other computer vision method evaluating sensor data generated by a sensor of a vehicle is capable of detecting a reasonable variety of difficulty levels while providing a fast and reliable evaluation and/or detection result.

The need is addressed by the subject-matter of the independent claims. Embodiments of the invention are described in the dependent claims, the following description, and the drawings.

DESCRIPTION

Figure 1:
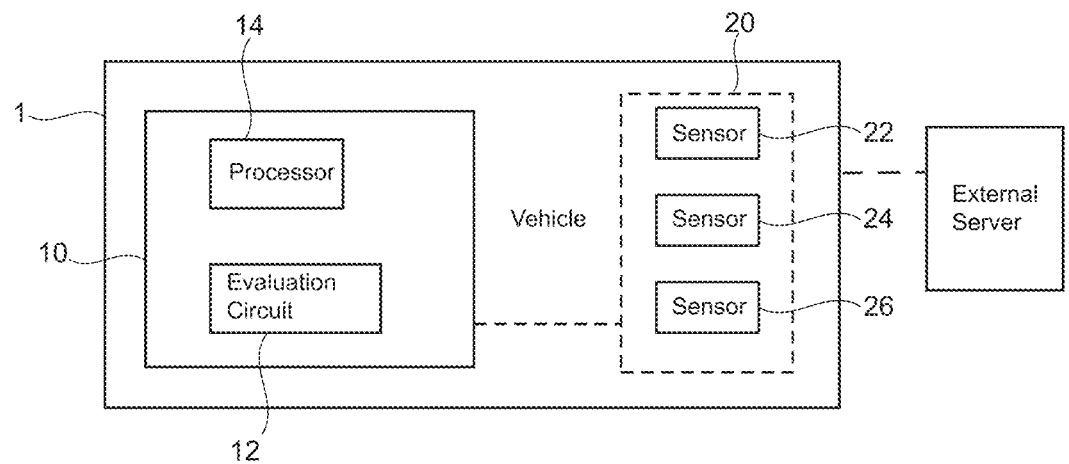
FIG. 1 a schematic view of a vehicle comprising an evaluation circuit according to an embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for automatically executing a vehicle function of a, for example at least partially autonomously controlled, vehicle based on spatially resolved raw sensor data for environment perception generated by at least one sensor for environment detection of the vehicle, includes receiving spatially resolved raw sensor data generated (for example recorded) by the at least one sensor of the vehicle.

Furthermore, the method according to some embodiments may comprise processing sensor data which are characteristic of the spatially resolved raw sensor data by a processor. The sensor data may be identical to the spatially resolved raw sensor data. The (spatially resolved) raw sensor data may also be preprocessed (via a computer-implemented method step) resulting in the sensor data. For example, the sensor data are (also) spatially resolved. For example, the (raw) sensor data are preprocessed in a computer-implemented data preprocessing step such that the data are in an appropriate input format for the processor (for example such that the data are in an appropriate input format for a neural network). For instance, a camera image may be cropped to remove unwanted image regions, e.g., the bonnet of the ego vehicle if visible in the camera image. Furthermore, preprocessing steps may include resizing to a preset input size (for instance of a neural network), for example while keeping the aspect ratio constant, and/or normalizing the sensor data (e.g., subtracting a measurement value mean of the entire (raw) sensor data from the raw sensor data) and/or division by a standard deviation. Such preprocessing steps allow a faster and more stable evaluation of the data.

For example, the spatially resolved raw sensor data are transferred from the (at least one) sensor to the processor. For example, the processor receives the raw sensor data and/or the sensor data which are characteristic of the spatially resolved raw sensor data.

The processor determines at least one region of interest of the (input) sensor data and at least one class for classifying the region of interest (via executing a computer-implemented method step, for example via performing a computer vision method).

Furthermore, the method in some embodiments may comprise processing the sensor data by an evaluation circuit (for example of the vehicle) based on the determined region of interest and hereby determining at least one local quality parameter which is characteristic for the quality of the sensor data with respect to at least a section of the region of interest and for example with respect to essentially the complete (or entire) region of interest (via executing a computer-implemented method step).

Furthermore and in some embodiments, the method may comprise executing the vehicle function in dependence on the local quality parameter (for example by a controller/processor of the vehicle). For example, more than one vehicle function (different from each other) is executed in dependence on the local quality parameter.

The local quality parameter for example indicates whether the (raw) sensor data are simple or difficult with respect to (essentially only) the region of interest. In other words, the local quality parameter for example indicates whether the evaluation of the sensor data with respect to the extraction of the content (and/or meaning and/or class) of the region of interest is (regarded as) difficult or simple (or moderate). The local quality parameter may be allocated a value or a quantity characteristic of a value out of a multitude of (continuously or discretely distributed) values.

Providing a local quality parameter is beneficial as it allows to derive a specific information of the quality of sensor data and/or the reliability of the sensor data specifically with the focus (only) on the region of interest.

For instance, considering an image recorded by a camera capturing the environment of the vehicle, with the main part of the captured environment being in bright sunshine and with the camera focusing on an object (for instance another vehicle) which is illuminated by the sun. Then, a pedestrian dressed in dark clothing staying in a small shadow area of the captured environment is very difficult to be detected for methods from the prior art as the sensor data corresponding to the pedestrian only form a low contrast with the captured background of the image (the shadow area).

The region of interest may be and/or may correspond to an (allocated and/or detected) object in some embodiments.

For example, regions of interest (for example objects) with low contrast (in intensity and/or color or the like) to (at least parts of) the background of the regions of interest and/or regions of interest which are of small size with respect to the entire sensor data (or image) are considered as being difficult to detect.

For example, small regions of interest (for example objects) and/or regions of interest (for example objects) with relatively low contrast with the background (of the region of interest) are considered difficult for the processor to determine a class for classifying the region of interest and/or (for example an (artificial) deep neural network) to detect (for example the object).

The suggested method is beneficial as it is a novel method to measure the difficulty of the presented region of interest, for example the (presented) object, which is applicable to computer vision tasks and/or detection tasks as 2D/3D object detection and semantic segmentation.

For example, the local quality parameter is a region-of-interest-related quantity. For example, this means that, particularly preferable, only sensor data of the region of interest are used and/or processed in order to determine the local quality parameter once the region of interest was determined. In this case, it is conceivable that only the sensor data with respect to the region of interest are transferred to and/or received by and/or processed by the evaluation circuit (via a computer-implemented method step).

It is also conceivable in some embodiments that also sensor data outside the region of interest are used and/or processed for the determination of the local quality parameter. For example, in this case only sensor data are used and/or processed which are determined with respect to the region of interest (for instance as they are (spatially) close to the region of interest and/or in the surrounding of the region of interest).

For example, the local quality parameter is no global quality parameter of all of the (raw) sensor data (received by the processor).

For example, the local quality parameter serves as a measure and/or as (kind of) an assessment standard of the quality of the sensor data and/or the reliability (or plausibility) of sensor data interpretation with respect to (only) the determined region of interest.

The vehicle function may also be a (different and/or new) detection and/or computer vision task (of the vehicle) initiated based on the local quality parameter.

For example, it is conceivable that the executing the vehicle function in dependence on the local quality parameter results in that the vehicle function is not executed or control parameters for executing the vehicle function are modified before the vehicle function is executed. For example, executing the vehicle function in dependence on the local quality parameter effects the vehicle function to be changed, activated, de-activated, stopped, paused and/or adjusted (e.g., via a change of a parameter with respect to the vehicle function, for example based on the (determined) local quality parameter).

For example, the vehicle function is a control function of the, for example at least partially autonomously or (fully) autonomously controlled, vehicle. The vehicle function may be a function being (for example automatically) executed (at least) as part of a driver assistance system of the vehicle.

The sensor data may be generated (and/or recorded) by the sensor while the vehicle is moving (in motion). For example, the sensor monitors surroundings of the vehicle and for example records sensor data for the detection of (movable and/or moving and/or stationary) objects (for instance obstacles, pedestrians, vehicles, side-walks, traffic participants, traffic lights, traffic signs, roadway markings, or the like) of the surroundings of the vehicle.

For example, the sensor data are generated by at least one sensor of the vehicle selected from a group which comprises a camera, a radar sensor, a lidar sensor, a thermal sensor, and the like and combinations thereof. These sensors beneficially are presently used for environment perception. For example, the sensor is used for at least one computer vision task/method.

For example, the (spatially resolved) sensor data comprise a multitude of pixels whereas for example each of these contains at least an intensity information.

For instance, the sensor data may be an (visible light) image captured by a camera. For example the image comprises a multitude (usually thousands) of pixels which contain color and/or brightness and/or intensity information.

For example, a lidar sensor is used as sensor (serving as high-precision data source). The raw sensor data of a lidar sensor comprise a multitude of pixels which for example are ordered in a lidar point cloud. Lidar points of a lidar point cloud may be mapped to voxels of a three-dimensional voxel space, and voxel clusters may be identified as objects.

A region of interest of the sensor data is for example understood to mean a (real) subset of the sensor data. In other words some (but not all) sensor data are chosen and selected to form the region of interest.

For example, the determination of the region of interest is done in such a way that the region of interest represents a meaningful part of the sensor data, especially with respect to a detection task (like 2D/3D object detection and/or semantic segmentation) and/or with respect to a context of the sensor data. For example, the region of interest corresponds (and/or comprises and/or contains) an object (to be detected).

For example, the (determined) region of interest is classified in terms of the occurrence of predetermined and/or predefined and/or preset classes (within the region of interest). For instance, (some of) the classes may be objects. For instance, a predefined class may be car, road or pedestrian. The classes are predefined and/or predetermined such that an (autonomous) vehicle may understand its surrounding via knowing which classes are located at a specific place in its surrounding.

For example, the determined subset of sensor data and/or the determined selection of sensor data (of pixels of the sensor data) and/or the selected part of sensor data forming the region of interest is connected (in a topological sense) and/or corresponds to a connected space.

For example, the region of interest and the class for classifying the region of interest is determined in such a way that this class may be assigned to at least part of the sensor data within the region of interest. This assignment may be done on a pixelwise level (as in semantic segmentation) or for a whole object in a bounding box (as done in 2D/3D-object detection).

In some embodiments, the determination of the local quality parameter includes the determination of at least one background region of at least a section of the region of interest and for example of the complete region of interest, for example by the evaluation circuit (via a computer-implemented method step). For example the background region is determined in a way that it forms the background of an detected object of the region of interest. This offers the benefit that the local quality parameter directly refers to the quality of the sensor data of the region of interest with respect to a background region hereto.

For example, the background region may be a surrounding region of the region of interest. For example the background region may have no intersection sensor data with the region of interest. For example, the background region lies at least partially and for example completely outside the region of interest.

It is conceivable that the background region is at least section-wise, and for example completely, part of the region of interest. Using 2D/3D object detection for instance, a bounding box is determined (as region of interest). It is only known that the detected object is somewhere within the bounding box but the precise position of the object with respect to the bounding box remains unknown. For example, an edge region of the bounding box (however at least partially and may be completely within the bounding box) and/or a region along the inner sidewall of the bounding box is determined as background region. Here, the probability is quite high that the determined background region represents a background and is not part of the foreground (of an detected object and/or item).

For example, the determination of background region depends on the boundary of the region of interest. For example, the background region follows at least in sections and may be over its entire extension (length) a course of the boundary of the region of interest.

For example, at least a section of a boundary of the background region and may be the whole boundary of the background region comprises curved side walls and for example consists (essentially) of curved side walls.

For example, the form and/or the course of a boundary of the background region corresponds essentially to the form and/or the course of the boundary of the region of interest.

In some embodiments, the background region is adjacent to the region of interest at least in parts and may be for example over its entire (geometrical) extension. This is beneficial as the adjacent relative arrangement with respect to each other improves the precision of the local quality parameter as the foreground (object) is evaluated with respect to the direct adjacent background region. Thus the evaluation whether the contrast of the foreground with respect to the background is sufficiently high, may be directly performed.

In some embodiments, the background region surrounds the region of interest at least partially and may be fully and/or completely and/or essentially over its entire boundary. This is beneficial as it allows the evaluation of the data quality of the foreground (which essentially corresponds to the region of interest, for example to an object detected and/or identified by the processor) to be assessed in the transition area between foreground (the object and/or the region of interest) and background. This transition area is beneficially expected to contain for example valuable information with respect to an evaluation of the quality of sensor data with respect to the region of interest (especially the object).

For example, the background region only surrounds (maximally) half of the boundary of the region of interest. This might be sufficient to provide a reliable evaluation result on the one hand and offers a very fast evaluation on the other hand (as there are less sensor data for the background region to be evaluated).

For example, the ratio of the number of pixels of the sensor data of the background region used to determine the local quality parameter to the number of pixels of the sensor data of the region of interest used to determine the local quality parameter is at maximum $\frac{1}{2}$, for example at maximum $\frac{1}{3}$, for example at maximum $\frac{1}{4}$, for example at maximum $\frac{1}{5}$, for example at maximum $\frac{1}{10}$, for example at maximum $\frac{1}{15}$, for example at maximum $\frac{1}{20}$, and for example at maximum $\frac{1}{40}$.

For example, the ratio of the number of pixels of the sensor data of the background region used to determine the local quality parameter to the number of pixels of the sensor data of the region of interest used to determine the local quality parameter is at least $\frac{1}{100}$, for example at least $\frac{1}{40}$, for example at least $\frac{1}{20}$, for example at least $\frac{1}{15}$, for example at least $\frac{1}{10}$, for example at least $\frac{1}{5}$, and for example at least $\frac{1}{4}$.

In some embodiments, the determination of the local quality parameter is based on a measurement quantity characteristic of at least one measurement value of the sensor, for example an intensity and/or brightness and/or an optical value (like color, gloss or the like), with respect to the sensor data of at least a section of the region of interest and for example with respect to all of the sensor data of the region of interest. This provides the benefit that an evaluation measure is provided taking into account quantities from which the quality of data and the reliability of the evaluation of the sensor data crucially depends on, while these measurement quantities (intensity, brightness and/or color) are taken into account in a very flexible way depending on the specific (shape and/or size of the) object.

For example, the determination of the local quality parameter is based on (for example all of) the sensor data of the (determined) background region.

In some embodiments, the determination of the local quality parameter is based on the mean of the intensities of a foreground of the region of interest and/or the mean of the intensities of the background region.

In some embodiments, the determination of the local quality parameter depends on a quantity characteristic of at least one geometric extension, for example a size or a quantity characteristic of the size, of at least a section of the region of interest and may be of the (entire) region of interest. This beneficially offers the possibility to take the (relative) size of the region of interest (for example the detected) object into account.

For example, the quantity characteristic of at least one geometric extension, for example a size or a quantity characteristic of the size, of at least a section of the region of interest is the quantity characteristic of at least one geometric extension, for example a size or a quantity characteristic of the size of a detected object within the region of interest (e.g., in the case of semantic segmentation evaluation techniques).

For example, the quantity characteristic of at least one geometric extension, for example a size or a quantity characteristic of the size, of at least a section of the region of interest is the quantity characteristic of at least one geometric extension, for example a size or a quantity characteristic of the size of a bounding boxed, which is for instance determined in the case of using 2D/3D object detection evaluation techniques.

For example, the quantity characteristic of at least one geometric extension, for example a size or a quantity characteristic of the size, of at least a section of the region of interest is a relative quantity, which is for example determined with respect to all of the sensor data.

For example, the quantity characteristic of at least one geometric extension, for example a size or a quantity characteristic of the size, of at least a section of the region of interest is a number of pixels of sensor data of the section of the region of interest (as an object) and for example of the region of interest compared to the number of pixels in the whole sensor data and/or compared to the number of pixels of the object sizes in sensor data and/or in the whole data-set of (a multitude of) sensor data.

In some embodiments, the processor applies a (for example computer-implemented) 2D object detection and/or (for example computer-implemented) 3D object detection and/or (for example computer-implemented) semantic segmentation or the like (via a computer-implemented method step). The use of these detection and/or evaluation techniques offers the benefit that object-related and/or class-related information may be extracted from the sensor data.

For example, the 2D/3D object detection outputs and/or determines a bounding box and a class for classifying an object being inside the bounding box.

In the case of semantic segmentation, each pixel of sensor data is assigned to a predefined class (like car, road, or pedestrian, or the like). This allows beneficially for example by an evaluation on pixel-level to extract and/or analyze the boundary and/or the shape of an object and/or item corresponding to the class which is assigned to the (determined) region of interest.

For example, instant semantic segmentation is used. This beneficially allows to extract and/or analyze the boundaries of a determined region of interest within the sensor data whereas each of the pixel is assigned to a predefined class.

In some embodiments, the determination of the local quality parameter is based on (the determination and/or calculation of) a metric, whereas the metric for example depends on a size of the region of interest and/or a contrast of the region of interest with respect to its background. For example, the metric is used to distinguish between hard, moderate, or easy data points, whereas one data point is one (input) sensor data (generated by a sensor simultaneously) out of a series of (input) sensor data (generated by a sensor in sequence. For example, a value is determined and/or calculated utilizing the metric, whereas for example in dependence of this value the local quality parameter is determined.

For example, a data-set (ranking) metric is determined (by the evaluation circuit via a computer-implemented method step). For that, for example, the region of interest size (for example the object size) based on the number of pixels and/or the relative contrast of the region of interest (for example the relative contrast of the object) with its background (for example with the determined background region) is considered and/or determined and/or taken into account (for the determination of the local quality parameter).

For example, at least one of the three, or at least two of the three, (so called) difficulty ranking metric are determined and/or extracted:

$$R_{joint}=1-\frac{1}{2}(12(F, B)+A),$$

$$R_{intensity}=1-12(F, B),$$

$$R_{size}=1-A,$$

where F for example is the mean of the foreground pixel intensities, B is the mean of the background pixel intensities, and A is the relative area of the region of interest, for example of the object, for example defined by the number of pixels normalized by the mean of the object size in the whole data-set.

Here, $12(\ldots,\ldots)$ represents the 12-norm.

For example, the three (difficulty) ranking metrics include:

$R_{intensity}$ is the intensity difference (contrast) of the foreground and the background (for example of the region of interest (or an object) and the determined background region), $R_{size}$ is the relative size of the region of interest, for example of the detected object, and $R_{joint}$ is a joint rank calculated by integrating the first two criteria.

For example, the metric includes a difference and/or a sum of a value which is dependent on a mean value of the foreground pixel intensities and a mean value of the background pixel intensities on the one hand and a value which is characteristic for a relative area and/or size of the region of interest (for example the object) on the other hand.

It is also conceivable for $R_{joint}$, to be defined as: $R_{joint}=1-12(F, B)+A$.

For example, in particular with $12(\ldots,\ldots)$ as well as A being normalized quantities, the above-mentioned definition for $R_{joint}$ may be preferred, as the resulting value for $R_{joint}$ will not be negative independent of the current values for $12(\ldots,\ldots)$ and A.

For example, the local quality parameter is determined based on at least one of these metrics.

For example a security quantity is derived and/or determined from the local quality parameter and/or based on at least one (calculated and/or determined) (difficulty) rank metric (by the evaluation circuit for example via a computer-implemented method step). For example, the security quantity is characteristic of the reliability and/or quality of the detection task (performed by the processor).

In some embodiments, the sensor data are processed by means of an artificial neural network (for example by the processor), the artificial neural network being supplied with the sensor data as input variables and the artificial neural network maps the input variables as a function of and/or in dependence of a parameterizable processing chain to output variables, wherein the output variables are characteristic for at least one region of interest of the (input) sensor data and at least one class for classifying the region of interest.

For example, the neural network generates output data from which a driver assistance system of the vehicle derives relevant information for partially or fully automated driving.

For example, the (artificial) neural network is designed as a deep artificial neural network, for example in which the parameterizable processing chain has a plurality of processing layers.

For example, the security quantity is used for safety argumentation of a deep neural network (which for example is intended to be used in vehicles for evaluating sensor data, for example during perception of DNNs), where for example the DNNs are evaluated on a variety of input datapoints (whereas one datapoint corresponds to one record of sensor data, for instance one image) with for example different difficulty levels.

For example, the (artificial) neural network is designed as a convolutional neural network (CNN) and/or a recurrent neural network (RNN).

For example, the artificial neural network is trained using predetermined training data, the parameterizable processing chain being parameterized by the training.

For example, the input layer of the artificial neural network is supplied with a digital image captured by a camera, and wherein the output layer of the artificial neural network provides a matrix of N-dimensional output vectors, each of the N-dimensional output vectors as a probability distribution with respect to one assignment to the N classes may be interpreted for example for a determined region of interest.

The vehicle function may be a function of a vehicle component of the vehicle. For example, the vehicle component is selected from a group comprising a system for driving and/or controlling the vehicle, a computer vision system, a navigation system, a warning system, a damping system of the chassis and/or vehicle, a vehicle climate control system, an entertainment system, an infotainment system, an opening system of a vehicle window, a comfort system for increasing the driving comfort of an occupant, a locking system of a vehicle door and/or a vehicle window, a vehicle locking system, a roof removal mechanism, a sunroof mechanism, a vehicle safety system (for example, a brake system), and/or a windshield wiper mechanism, or the like, and combinations thereof.

For example, the spatially resolved raw sensor data are generated and/or recorded in a joint recording (and thus at the same time). It is conceivable that more recordings, for example recorded by one sensor and for example recorded one after the other (in immediate succession), are used as raw sensor data.

The sensor may be arranged on and/or in the vehicle. The sensor may be arranged on an outer part of the vehicle.

For example, the vehicle (whose vehicle function is to be executed) comprises the sensor for environment detection of the vehicle, for example as a (for example fixed) component of the vehicle.

It is conceivable that the sensor for environment detection of the vehicle is the sensor of a vehicle (and/or another object) which is different from the vehicle whose vehicle function is to be executed. For instance, it may be the sensor of another vehicle which is in communication connection with the vehicle (e.g., via "Vehicle-to-Vehicle", V2V communication and/or "Vehicle-to-Infrastructure", V2I communication, and/or "Vehicle-to-X", V2X communication).

In some embodiments, an evaluation circuit is provided for a vehicle for evaluating spatially resolved raw sensor data for environment perception generated by at least one sensor for environment detection of the vehicle, wherein the evaluation circuit is configured to receive sensor data which are characteristic of spatially resolved raw sensor data, wherein the evaluation circuit is configured to receive a determined region of interest of the sensor data, wherein the evaluation circuit is configured to process the sensor data based on the determined region of interest and hereby determining at least one local quality parameter which is characteristic for the quality of the sensor data with respect to at least a section of the region of interest and may be with respect to the entire region of interest. In some embodiments, the region of interest may be (or essentially correspond to) an object detected, for example by a processor (for instance an in the context of the aforementioned method described processor) of and/or for a vehicle (via a computer-implemented method step and/or for example via a computer vision method).

For example, the evaluation circuit provides at least one signal with respect to execute the vehicle function in dependence on the local quality parameter. For example, this signal is transferred to a control device of the vehicle.

For example, the evaluation circuit is configured, suitable and/or intended to carry out the above-described method steps already described above in the context of the evaluation circuit in connection with the method, individually or in combination with each other. Conversely, the method may be provided with all features described in the context of the evaluation circuit, individually or in combination with each other.

In some embodiments, it is suggested for the evaluation circuit to determine a local quality parameter which may serve as a measure for the quality of sensor data of an individual region of interest and for example of an object. This beneficially allows to analyse the quality of the sensor data of the (or within the) region of interest (and for example object) in a very specific way which depends on the specifically determination of the region of interest (or the object). This allows a very fine and individual assessment of the quality of (input) sensor data which are of specific interest for a detection task with respect to the region of interest (for instance an object detection task).

Some embodiments are directed to a vehicle, for example motor vehicle and/or designed for autonomous or partially autonomous controlled driving, comprising an evaluation circuit for a vehicle according an embodiment described above.

For example, the vehicle comprises a controller (communicatively) connected to the evaluation circuit and having at least one output for controlling at least one actuator of the vehicle, the controller being configured to perform the control function as a function to execute a vehicle function in dependence of the local quality parameter determined by the evaluation circuit, for example by controlling the at least one actuator.

The vehicle may for example be a (motorized) road vehicle. The vehicle may be a motor vehicle, which is for example a motor vehicle controlled by the driver himself ("driver only"), a semi-autonomous, autonomous (for example, autonomy level 3 or 4 or 5 (of the SAE J3016 standard)) or self-driving motor vehicle. In this context, autonomy level 5 refers to fully automatic driving vehicles. Likewise, the vehicle may be a driverless transport system. The vehicle may be controlled by a driver or drive autonomously. Furthermore, in addition to a road vehicle, the vehicle may also be an air cab, an aircraft, and other means of transportation or another type of vehicle, such as an air, water, or rail vehicle.

Furthermore, some embodiments pertain to a computer-implemented method for evaluating, for example for validation of and/or verification of, a computer-implemented computer vision method for (and/or performed by) a processor of a vehicle. In the computer-implemented computer vision method, sensor data for environment perception generated by at least one sensor for environment detection of the vehicle are processed and evaluated by determining at least one region of interest and a class classifying the region of interest.

In some embodiments, for provided and/or given training data, the method includes an evaluation of the quality of the training data in terms of a local quality parameter, which is determined based on the quality of sensor data with respect to the region of interest. For example, the method includes determining the local quality parameter.

For example, the method for evaluating a computer-implemented computer vision method comprises at least one and for example more method steps (individual and/or in combination with each other) which are performed and/or executed by the evaluation circuit described above in the context of the method for automatically executing a vehicle function of a, for example at least partially autonomously controlled, vehicle. Here, for example, training data are used instead of sensor data.

For example, the method for evaluation a computer-implemented computer vision method includes determining the local quality parameter by the determination of at least one background region of at least a section of the region of interest and for example of the complete region of interest.

For example, the determination of the local quality parameter is based on the determination of a metric, whereas the metric depends on a size of the region of interest and/or a contrast of the region of interest with respect to its background. For example, the metric comprises the properties and/or a definition as disclosed above in the context of the method of for automatically executing a vehicle function of a, for example at least partially autonomously controlled, vehicle.

Beneficially it is suggested that the quality of training data is evaluated in terms of the (local) data difficulty.

In some embodiments, the method includes selecting training data based on the local quality parameter of the training data, respectively. These training data may beneficially be used for training a (artificial) neural network on which for example the computer vision method is based on. For example, a sufficient amount of training data is selected, that includes a wide range of data difficulties. This allows a very specific training of the neural network such that in total the amount of training data may be reduced. Furthermore, the training data may be selected and generated in a very targeted way as it may be determined which local quality parameter the training data to be (newly) selected and/or generated should have. This facilitates the creation of the sets of training data used for training the neural network.

For example, the computer vision method comprises individual or more method steps described in the context of the aforementioned method steps executed by the processor, whereas training data are provided and processed and/or evaluated instead of the sensor data (mentioned in the context of the method step(s) performed by the processor). For example the computer vision method may execute an object detection task based on the training data.

For example, the method comprises providing training data.

For example, the computer vision method comprises processing the (training) data by means of an artificial neural network, and for example by means of a DNN.

For example, the method is used for safety argumentation of perception DNNs, where for example the DNNs are evaluated on variety of input datapoints with different difficulty levels. For example datapoints are a set of senor data and/or training data.

For example, a neural network, for instance a DNN, is evaluated with different data difficulty levels. For example two training sets are understood to have a different data difficulty level when the local quality parameter of a region of interest differs from each other.

For example, the method for evaluating, for example for validation of and/or verification of, a computer-implemented computer vision method is executed on an external server, for instance a backend system.

For example, the quality of the training data is evaluated in terms of the data difficulty, and for example in terms of the local quality parameter of the training data. For example a sufficient amount of training data is selected that includes a wide range of data difficulties.

For that, for example the difficulty of the presented data points in the training data-set is measured and analyzed. Based on this analysis, the under/over represented difficulty regions in the data-set are recognized, which is then used to select data while maintaining a reasonable difficulty balance.

For example, the computer vision method, for example a neural network (a DNN), is evaluated with different (training) data difficulty levels. For example a difficulty level is determined based on the local quality parameter.

For that, for example the data difficulty metric may be used for safety argumentation of DNNs. By this means, the maximum data difficulty which the DNN is capable of detecting is recognized and compared with the specified minimum level.

For example, the data difficulty metric and/or the local quality parameter is used as a pass/fail argument for the computer vision method and for example for a DNN.

In some embodiments, the method includes using the local quality parameter as evaluation criteria for the application of the computer vision method, for example of a neural network (for instance a DNN), in a for example highly automated driving system.

Basically, the method for automatically executing a vehicle function of a vehicle and/or the method for evaluating a computer vision method may be used in any computer vision task, and for example detection task, in or outside automated driving field, even if both have been described (only) with respect to a vehicle and/or automated driving field.

The external server is, for example, a backend of a vehicle manufacturer or a service provider. The functions of the backend or the external server may be performed on (external) server farms. The (external) server may be a distributed system. The external server and/or the backend may be cloud-based.

Some embodiments pertain to a computer program or computer program product comprising instructions, for example a program code, which represents or codes at least the method steps of each of the two methods according to the teachings herein and for example at least one of the described embodiments.

Some embodiments pertain to a data memory on which at least one embodiment of the computer program according to the teachings herein is stored. For example, in case of the method for evaluating, for example for validation of and/or verification of, a computer-implemented computer vision method for and/or performed by a processor of a vehicle, the data memory may be the above-mentioned external server, which may be a backend of a OEM or a service provider.

In the context of this discussion, the terms 'processor', 'controller', and 'evaluation circuit' are understood broadly to comprise hardware and hardware/software combinations to provide the respectively discussed functionality. The respective processor', 'controller', and/or 'evaluation circuit' may be formed integrally with each other and/or with further components. For instance, the functionality of the processor', 'controller', and/or 'evaluation circuit' may be provided by a microprocessor, microcontroller, FPGA, or the like, with corresponding programming. The programming may be provided as software or firmware, stored in a memory, or may be provided by dedicated ('hard-wired') circuitry.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

FIG. 1 shows a schematic view of a vehicle 1 whereas the vehicle here comprises three different sensors 22, 24, 26, each of them for example being part of an environment perception system 20 of the vehicle 1.

Sensor data generated by the sensor 22 may be transferred to a processor 10 and/or a processor 14 (of the processor) comprising at least one processor and a memory in order execute executable instructions. The processor 14 processes received sensor data and determines at least one region of interest (for example an object) of the sensor data and at least one class for classifying the region of interest (for example the object).

Reference sign 12 denotes an evaluation circuit (of the processor 10) of the vehicle 1 which is configured to process the sensor data based on the determined region of interest. Furthermore, the evaluation circuit determines a local quality parameter which is characteristic for the quality of the senor data with respect to at least a section of the region of interest (for instance the detected object).

Figure 2:
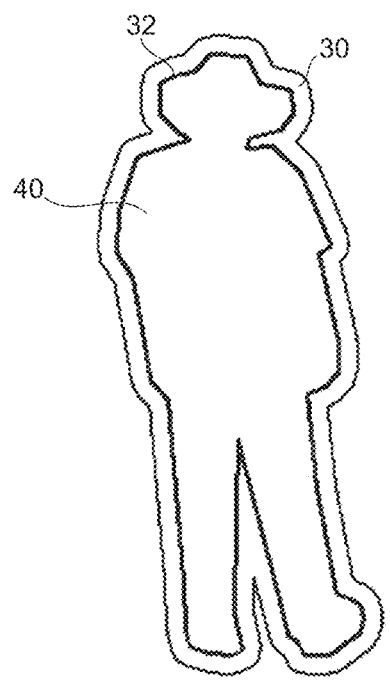
FIG. 2 exemplary sample areas considered in determining the local quality parameter.

FIG. 2 shows sample areas (of sensor data, as for instance an image captured by a sensor) considered in calculations, for example for determining the local quality parameter.

Reference sign 40 denotes a regions of interest from the input sensor data, for instance based on the pixel annotations. The region of interest 40 may be an object detected by the processor via executing a (computer-implemented) detection method. Here, the region of interest 40 corresponds to an object which may be classified by the class "pedestrian".

Reference sign 30 denotes a background region of the region of interest 40, which here completely surrounds the region of interest 40. As may be seen from FIG. 2, the shape of the background region 30 follows the shape of the boundary 32 of the region of interest 40.

For example the pixel intensity and/or the size of the presented object (here the region of interest 40) is compared to its background. By that means, small objects or objects with relatively low contrast with the background are considered as difficult for evaluation techniques (as a DNN) to detect.

Based on the determination of a region of interest 40, for example as foreground, and a background region 30, for example a metric may be used as an evaluation criteria during a validation and/or verification process of the DNNs which are supposed to be deployed in a highly automated driving system.

For example, two criteria, namely the object size based on a number of pixels and a relative contrast of the object with its background (for example background region 30), are considered to extract at least one of the three difficulty ranking metric as follows:

$$R_{joint}=1-\frac{1}{2}(l2(F,B)+A),$$

$$R_{intensity}=1-l2(F,B),$$

$$R_{size}=1-A,$$

where F for example is the mean of the foreground (corresponding to the object 40) pixel intensities, B is the mean of the background (corresponding to the background region 30) pixel intensities, and A is for example the relative area of the of the object, defined by the number of pixels normalized by the mean of the object sizes in the whole data-set.

Here, l2 ( . . . , . . . ) represents the l2-norm.

Accordingly, the three (difficulty) ranking metrics include:

$R_{intensity}$ is the intensity difference (contrast) of the foreground and the background, $R_{size}$ is the relative size of the object, and $R_{joint}$ is a joint rank calculated by integrating the first two criteria.

For example, the local quality parameter is determined based on at least one of these metrics.

As mentioned above, it is also conceivable for $R_{joint}$ to be defined as $R_{joint}=1-l2(F,B)+A$. For the reasons mentioned above, the above-mentioned definition is preferred at least for l2 (F, B) and A being normalized quantities.

LIST OF REFERENCE NUMERALS

1 Vehicle
10 Processor
14 Processor
12 Evaluation circuit
30 Background region
32 Boundary of the region of interest
40 Region of interest The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for automatically executing a vehicle function of a vehicle based on spatially resolved raw sensor data for environment perception generated by at least one sensor for environment detection of the vehicle, comprising:
    receiving spatially resolved raw sensor data generated by the at least one sensor of the vehicle;
    processing sensor data which are characteristic of the spatially resolved raw sensor data by a processor, the processor determining at least one region of interest of the sensor data and at least one class for classifying the region of interest;
    processing the sensor data by an evaluation circuit based on the determined region of interest and determining at least one local quality parameter, comprising information on one or more of quality and reliability of the sensor data specifically for the region of interest;
    executing the vehicle function in dependence on the local quality parameter; wherein
    the determination of the local quality parameter comprises the determination of at least one background region of at least a section of the region of interest or of the complete region of interest.

2. The method of claim 1, wherein the background region is adjacent to the region of interest at least in parts.

3. The method of claim 1, wherein the determination of the local quality parameter is based on a measurement quantity characteristic of at least one measurement value of the sensor.

4. The method of claim 1, wherein the determination of the local quality parameter is based on the mean of the intensities of a foreground of the region of interest and/or the mean of the intensities of the background region.

5. The method of claim 1, wherein the determination of the local quality parameter depends on a quantity characteristic of at least one geometric extension of at least a section of the region of interest.

6. The method of claim 1, wherein the determination of the local quality parameter is based on the determination of a metric, whereas the metric depends on a size of the region of interest and/or a contrast of the region of interest with respect to its background.

7. The method of claim 1, wherein the processor applies one or more of a 2D object detection, 3D object detection, and semantic segmentation.

8. The method of claim 1, wherein the sensor data are processed by an artificial neural network, the artificial neural network being supplied with the sensor data as input variables and the artificial neural network maps the input variables in dependence of a parameterizable processing chain to output variables, wherein the output variables are characteristic for at least one region of interest of the sensor data and at least one class for classifying the region of interest.

9. The method of claim 1, wherein the sensor data are generated by at least one sensor of the vehicle selected from the group of sensors which comprises a camera, a radar sensor, a lidar sensor, a thermal sensor, and combinations thereof.

10. An evaluation circuit for a vehicle for evaluating spatially resolved raw sensor data for environment perception generated by at least one sensor for environment detection of the vehicle, wherein the evaluation circuit is configured to receive sensor data which are characteristic of spatially resolved raw sensor data, wherein the evaluation circuit is configured to receive a determined region of interest of the sensor data, wherein the evaluation circuit is configured to process the sensor data based on the determined region of interest and to determine at least one local quality parameter, which local quality parameter comprises information on one or more of quality and reliability of the sensor data specifically for the determined region of interest, wherein the determination of the local quality parameter comprises the determination of at least one background region of at least a section of the region of interest or of the complete region of interest.

11. A vehicle, comprising an evaluation circuit according to claim 10.

12. A computer-implemented method for evaluating a computer vision method performed by a processor of a vehicle, in which computer vision method sensor data for environment perception generated by at least one sensor for environment detection of a vehicle are processed and at least one region of interest and a class classifying the region of interest is determined, wherein the method for evaluating comprises:

evaluating of the quality of provided training data in terms of a local quality parameter, which local quality parameter is determined based on the quality of sensor data with respect to the region of interest and which local quality parameter comprises information on one or more of quality and reliability of the sensor data specifically for the determined region of interest.

13. The method of claim 12, comprising: selecting training data based on the local quality parameter of the training data, respectively.

14. The method of claim 12, comprising: using the local quality parameter as evaluation criteria for the application of the computer vision method in an automated driving system.

15. The method of claim 3, wherein the at least one measurement quantity comprises one or more of an intensity and an optical value with respect to the sensor data of at least a section of the region of interest.

16. The method of claim 2, wherein the determination of the local quality parameter is based on the mean of the intensities of a foreground of the region of interest and/or the mean of the intensities of the background region.

17. The method of claim 3, wherein the determination of the local quality parameter is based on the mean of the intensities of a foreground of the region of interest and/or the mean of the intensities of the background region.

18. A method for automatically executing a vehicle function of a vehicle based on spatially resolved raw sensor data for environment perception generated by at least one sensor for environment detection of the vehicle, comprising:

receiving spatially resolved raw sensor data generated by the at least one sensor of the vehicle;

processing sensor data which are characteristic of the spatially resolved raw sensor data by a processor, the processor determining at least one region of interest of the sensor data and at least one class for classifying the region of interest;

processing the sensor data by an evaluation circuit based on the determined region of interest and determining at least one local quality parameter which is characteristic for the quality of the sensor data with respect to at least a section of the region of interest; and executing the vehicle function in dependence on the local quality parameter, wherein the sensor data are processed by an artificial neural network, the artificial neural network being supplied with the sensor data as input variables and the artificial neural network maps the input variables in dependence of a parameterizable processing chain to output variables, wherein the output variables are characteristic for at least one region of interest of the sensor data and at least one class for classifying the region of interest.

* * * * *